United States Patent [19]

Smith

[11] Patent Number: 4,807,426

[45] Date of Patent: Feb. 28, 1989

[54] CRIMPER BAR SET FOR FORMING HERMETICALLY SEALED PACKAGES

[76] Inventor: Larry E. Smith, 900 Bexley Dr., Perrysburg, Ohio 43551

[21] Appl. No.: 93,642

[22] Filed: Sep. 8, 1987

[51] Int. Cl.⁴ .......................... B65B 9/08; B65B 51/30; B65B 51/16; B65B 51/14
[52] U.S. Cl. ......................... 53/550; 53/551; 53/552; 53/373; 156/515; 156/581; 156/583.1
[58] Field of Search ................. 53/373, 379, 550, 551, 53/552; 156/515, 581, 583.1

[56] References Cited

U.S. PATENT DOCUMENTS

| | | | |
|---|---|---|---|
| 2,607,696 | 8/1952 | Kunz | 53/550 X |
| 3,243,487 | 3/1966 | Smith | 53/373 X |
| 3,468,731 | 9/1969 | Obeda | 53/373 X |
| 3,847,711 | 11/1974 | Howard | 156/581 X |
| 3,943,686 | 3/1976 | Crawford et al. | 53/550 X |
| 4,254,601 | 3/1981 | Prager et al. | 53/552 X |
| 4,452,660 | 6/1984 | Davies et al. | 156/581 X |
| 4,455,808 | 6/1984 | Netzhammer | 53/379 X |
| 4,582,555 | 4/1986 | Bower | 53/373 X |
| 4,617,782 | 10/1986 | Mattei et al. | 53/373 X |
| 4,693,058 | 9/1987 | Kovacs | 53/379 X |

*Primary Examiner*—Horace M. Culver
*Attorney, Agent, or Firm*—Paul F. Stutz

[57] ABSTRACT

In continuous packaging of comestibles in individual packages of thermo plastic sheet material, elongate, reciprocating crimper bars or dies simultaneously sever the packages and inpart end crimp seals to the packages but unfortunately featuring a high rate of rejects overcome by a special contour in the surface of one of the said crimper dies, according to present discovery.

11 Claims, 3 Drawing Sheets

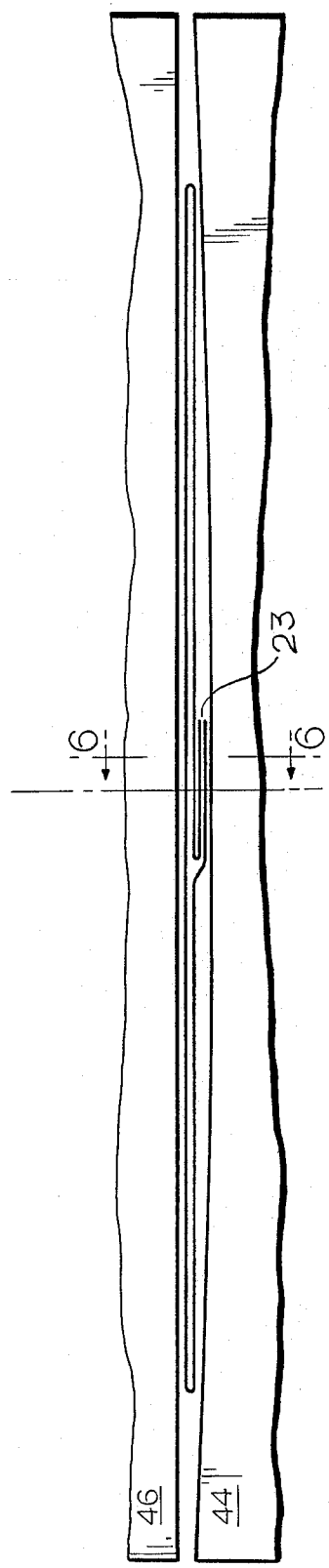
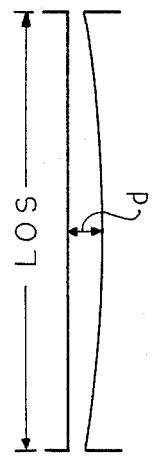
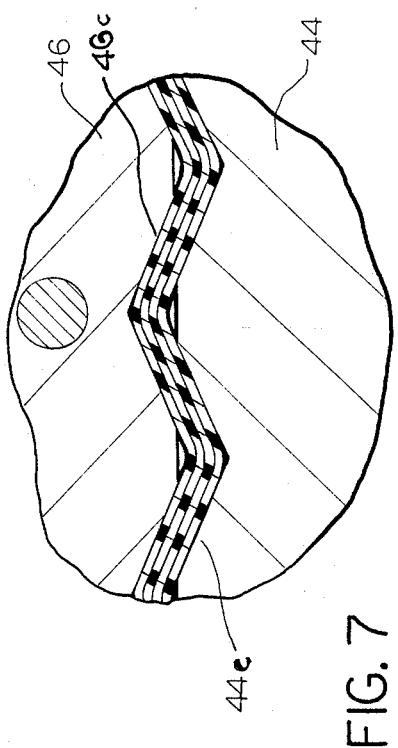
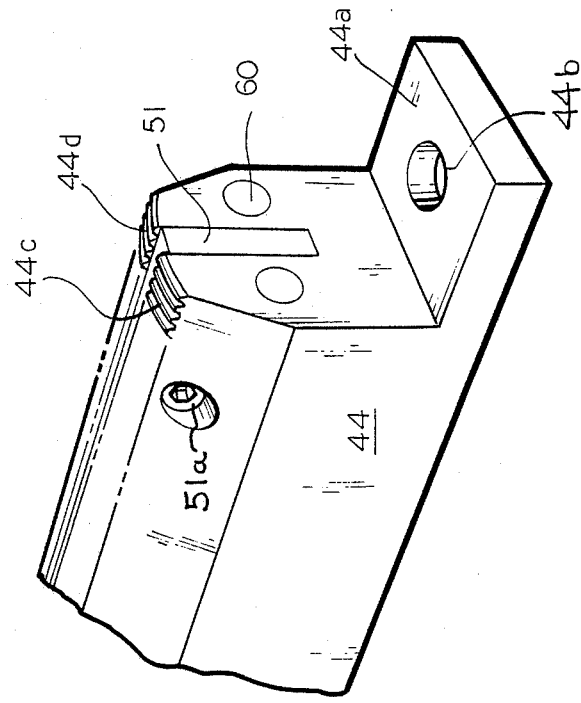
FIG. 4
FIG. 9
FIG. 7
FIG. 8

CRIMPER BAR SET FOR FORMING HERMETICALLY SEALED PACKAGES

The present invention relates to the packaging art generally. More particularly, the present invention relates to improvements in packaging machinery which greatly enhances the quality and integrity of packages formed of thermo-plastic film or sheet material and adapted to contain comestibles, such as cookies, potato chips, candy bars, etc.; desireably maintained in an air tight package which maintains freshness, taste, flavor, and therefor of generally improved and prolonged shelf life. Stated otherwise the machinery improvements contemplated herein yield packages of reduced product deterioration ordinarily leading to spoilage, customer dissatisfaction, waste, rejection, etc., otherwise experienced without the improvements. The packaging art, to which the improvements constituting the present invention relate, is that dealing with continuous, automatic package formation and package filling.

BACKGROUND OF THE INVENTION

The aforesaid type of packaging begins with an endless sheet or length of the thermo-plastic sheet material (sometimes foil) and of proscribed width carried on a reel or spool. The sheet material is pre-printed with repetitive package designs featuring the same appropriate art/color scheme, identification of product, identification of proprietor, and ingredient identify and content, trademarks, logos, package weight, warnings, price coding, directions; all as relate to the plurality of individual, product-filled packages to be formed with the continuous length of sheet or film bearing repeated duplications of the foregoing information.

Each segment of length ultimately forming a package, of course, also includes an electric dye mark for automatically adjusting and correlating the speed of the elongate sheet or film to that of the speed of the product to be packaged and other associated machine elements which must operate in timed relationship and sequence to achieve the ultimate desired package having the design/art work and printed information in proper registration with respect to the crimp sealing between each item or amount of product as will be described.

The sheet material is continuously withdrawn and passed in a linear path through either a horizontal or vertical machine. In each case, the sheet material, by appropriate forming elements, is transformed into an oval or tube-like structure by bringing the marginal edges overlappingly together and sealed (lap or film) forming said oval envelope or tube. Simultaneously or continuously a properly measured amount, weight or number of comestible is introduced into the tube and thereafter, just downstream, the forward (or leading) edge/segment is crimp sealed between elongate reciprocating crimper bars or dies positioned transverse to the linear path of the packaging operation to thereby seal the package at the leading edge. The crimper bars or dies also include a cutter blade and anvil, in one or the other, to sever the sheet material to form individual packages. Further as the product and sheet material, in torus form, is continuously moved forward, a trailing edge crimp seal is imparted by the reciprocating crimper bars to hermetically seal the package and included product. Simultaneously a crimp heat seal is formed on the leading edge of the second package, which is being filled with product simultaneously in the manner described. The operation repeats continuously to form a plurality of individual packages which are desireably hermetically sealed to isolate comestible from the ambient conditions and accordingly extend shelf life during which comestible will remain in fresh-/undeteriorated condition.

PRIOR ART

Applicant is aware of a number of Prior Art Patents dealing with heat sealing of plastic materials; eg. U.S. Pat. No. 3,986,914; U.S. Pat. No. 4,135,957; U.S. Pat. No. 3,258,385; U.S. Pat. No. 3,153,607. He is also aware of U.S. Patents dealing with package making; eg. U.S. Pat. No. 4,403,465; U.S. Pat. No. 2,442,936; U.S. Pat. No. 2,239,133. Applicant is also familiar with the following U.S. Patents dealing with dies and splicing machines; eg. U.S. Pat. No. 2,724,424; U.S. Pat. No. 4,582,555; and U.S. Pat. No. 4,455,808.

However, none of these aforesaid Patent disclosures have shed any light or suggested an approach to overcoming the problems, defects, deficiencies, including package destructions and rejects as experienced prior to Applicant's discovery of the approach described, set forth and claimed in the present Specification.

BACKGROUND DIFFICULTIES

In the procedures as outlined hereinabove, the crimping operation has heretofore been beset/accompanied with a variety of and number of difficulties.

One difficulty resides in the failure in achieving a suitable and reproducably reliable hermetic seal on a consistent basis. One of the factors contributing to this particular difficulty resides in the multiple thicknesses involved in either the fin or lap seal or gussets running longitudinally with respect to the packaging/formation/fill direction of the sheet material and ultimately the filled package. As indicated previously, the lateral edges of the continuously moving length of sheet material are urged down and under into overlapped and sealed relationship which creates a double thickness of the sheet material where the edges are simply over lapped one edge over the other creating a so-called lap seal.

The problem is even more exaggerated in applications employing a fin seal. In a fin seal, the edges are wrapped or formed by the forming shoe in such fashion so that a region along each lateral edge is brought together into mutually abutting/facing relationship to define a double thickness depending fin, which projects downwardly. This fin is guided between a pair of counter rotating rolls or sets of rolls. One or more of these sets of rolls may be rubber covered to compress the two-thickness fin and urge it in the direction appropriate to the operation. One set of counter rotating rollers is heated and grooved, knurled or serrated to impart a multiple sealing crimp which, in effect, welds the mutually abutting/facing regions, adjacent each lateral edge, together with a unitary air tight structure. Just downstream, the fin is guided by appropriate guides, either to the right or to the left, as viewed in an endwise view, to lie in flush relationship with the bottom surface of the tubular package. The seal, whether it be "lap" or "fin" is generally, centrally located with respect to the package. Of course the front, or leading, and rear, or trailing edge crimp of each package necessarily involves four thicknesses of sheet material where a fin seal is employed.

Another difficulty encountered in the packaging operation, as just described, resides in the phenomena referred to in the art as "walking". This term describes the tendency of the longitudinal seal, or the sheet making up the ultimate package, to move sideways to the right, or sideways to the left. While it is not known with certainty, it is believed that the "walking", that is the lateral movement to the right or left, is a by-product or result of the intermeshing of the serrations or knurls, as they undergo intermeshing registration in the manner indicated and described with more particularity hereinafter. Also believed to be a factor, is the irregularity or departure from symmetry of the envelope caused by the contents within, which may be of irregular contour or shape. Thus the sheet material being slightly stiff tends to accomodate or adjust itself to the irregularities in the continuously moving envelope itself, as filled, and/or following sealing. This accomodation and adjustment of the somewhat stiff thermo-plastic sheet material is believed to result in an underdesiriable tendency of the structure to move laterally, thereby yielding possible interruption in production, a package distorted configuration, of uneven seal chacter and in extreme cases package failure.

Furthermore, it is additionally believed, that the right-hand or left-hand "lay" or position of the fin seal tends to cause the "walking" phenomena, either in and of itself, or in combination with the intermeshing phenomena or the departure from symmetry phenomena, as discussed hereinabove. Whatever the reason, if the spaced crimp seal frequently fails to register, or the thickness aspect causes a "cut through" due to uneven pressure, occasioned by the above described "walking;" it is seen that incomplete sealing is likely. A seal which is incomplete, insufficient or accompanied by cut-through results in an incomplete, unsatisfactory package which will usually affect two packages in adjacent relationship, resulting in rejects, which translates into increased costs, or loss or decrease of profits. It has not been uncommon heretofore for package rejects to run 35% or higher.

It is also believed that packages exhibiting undesired wrinkles are caused by the foregoing. Rejects can be observed in product inspection or if it be ranther subtle; the reject may not be discovered until it reaches the retailer, or, even more damaging, the consumer.

OBJECTS OF THE INVENTION

With the foregoing introduction, it may be stated as a general object of the present invention, to provide an improved construction and arrangement as pertains to crimper bar sets (pertaining to horizontal machines) or sealing jaw sets, (pertaining to vertical machines) which, when utilized in the manner hereinabove generally referred to, and more particularly described hereinafter, which alleviate, overcome, eliminate, and/or significantly reduce the number of reject packages of comestible, or other product, due to failure of seal, or seal cut through.

It is a further object of the present invention to provide a packaging characterized by increased and improved efficiency, increased speed, and accordingly increased through put and profit, all without sacrificing seal integrity, and in fact improving seal integrity.

It is an additional object of the present invention to provide a crimp seal area which significantly reduces the number of wrinkles, which otherwise adversely affect the efficiency or quality of the desired hermetic seal and which in any case are unattractive and unappealing leading to lost sales or returns.

It is still another object of the present invention to provide an improved hermetic seal in the region of the multiple thicknesses without any corresponding increase in the number of package rejects, by reason of destruction or deterioration of the thermo-plastic sheet material, both in the specific seal area and contiguous or adjoining area.

The foregoing, and as well, other objects of the present invention will become apparent to those skilled in the art from the following more detailed description, taken in conjunction with the annexed sheets of drawings. on which there is presented for purposes of illustration only, a preferred embodiment of the present invention.

DRAWING DESCRIPTION

In the Drawings

FIG. 4 is an end view, which, in schematic form, illustrates the crimper bars of the crimper bar set of the present invention, in facing but slightly spaced relationship with the thermo-plastic sheet material shown in single line there between and with the formed fin seal lying flushly to the right up against the adjoining region of the tubular package.

FIG. 7 is a sectional view taken on the line 7—7 in FIG. 6.

FIG. 8 is a perspective view of an end portion of the crimper/cutter bar/die, in accordance with the present invention.

FIG. 9 is a schematic view of a crimper bar/set, greatly exaggerated in proportion and dimension, for purposes of illustrating the primary feature of the present invention to wit; "bow", in terms of its relationship to the other crimper bar etc.

BRIEF DESCRIPTION OF THE INVENTION

In brief, the present invention resides in the discovery that hermetic seals, formed in packages formed of thermo-plastic sheet by elongate, opposed, facing, knurled pressure bars, referred to in the trade as crimper bars or jaws, (and sometimes crimper dies) can be markedly improved by providing for a degree of concavity along the length of the facing surface of the bar or jaw nominally and normally contacting the variant thickness or ply in the longtitudinal seal, whereby, pressure cut-through and hermetic seal failure normally experienced with such multiple thickness ply seals is eliminated or significantly alleviated.

DETAILED DESCRIPTION OF INVENTION

Figures 1, 2, 3:
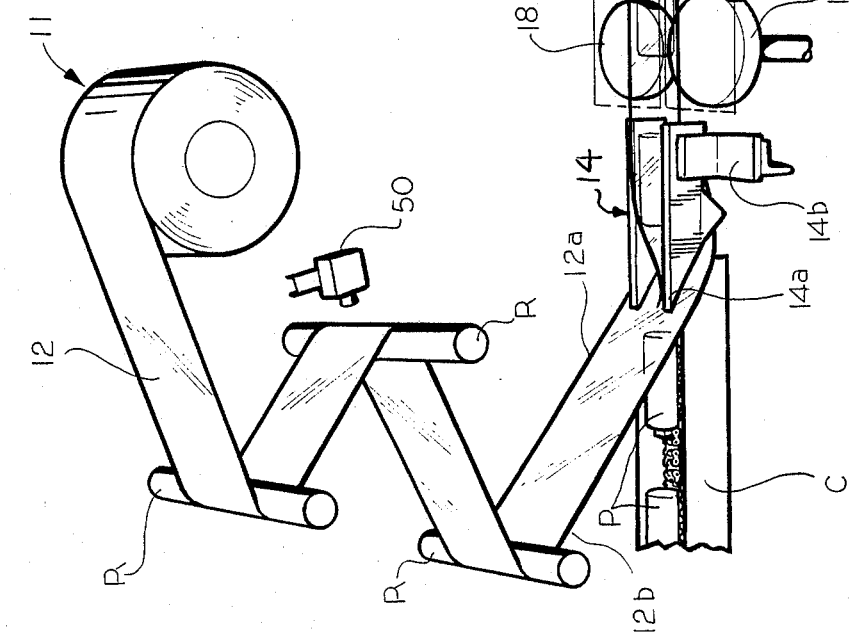
FIG. 1 is a partially schematic, three-quarter, perspective view of an array of machine components constructed and arranged for converting an endless or continuous sheet of film into a package, in keeping with, and corresponding to, the environment of the present invention and specifically showing a pair of crimper bars in operative contacting relationship to affect an improved seal.
FIG. 2 is a sectional view taken on the line 2—2 in FIG. 1.
FIG. 3 is a sectional view taken on the line 3—3 in FIG. 1.

Referring now more specifically to the drawings, the detailed description will begin with FIG. 1, which illustrates in a perspective overview, the continious operation in which the invention finds most immediate application. The process begins with an endless roll 11 of thermo-plastic sheet material 12, and a plurality of product, pieces or portions, P, which are combined to produce a packaged product PP.

The sheet material 12, usually of thermo plastic sheet or film or metal foil film contains a repeating sequence of decorations, and printed information appropriate to the packaged product and is entrained over a series of rollers R, and, from the latter of the series, downwardly in an inclined direction to a package former 14, which includes guides 14a and 14b, which fold the marginal edges 12a of the sheet material 12 downwardly and inwardly. Simultaneously, a number of products are delivered by a conveyor C, in continous fashion and merged with the sheet material as it is being formed into a generally hollow, oval or tubular structure, identified by the reference numeral 20, adapted to receive a single product P, as shown in FIG. 2, and with the regions of the sheet material along the lateral edges 12a and 12b, formed by the former 14 into mutual abutting relationship and directed between contacting pull wheels 17 and 18 which urge the entire structure in the direction of the arrow 16. The continues tubular or oval shaped structure containing product in spaced relationship, continues in the direction indicated by the arrow 16 and the lateral edge regions 12a and 12b pass abuttingly through grooved, heat-seal rollers 19 and 21 which impart a crimp heat-seal to the abutting lateral edge regions formed by the merger and creating a so-called fin seal, identified by the reference numeral 23, which projects vertically downwardly and thereby available for contact by downstream pull wheels 24 and 25. Thereafter, the fin seal 23 is folded/moved into flush abutment with the bottom of structure 20 by deflector 27 as shown in FIG. 3 from there the structure passes to the end crimp seal station identified generally by the reference numeral 30.

It is the purpose of the array of elements at station 30 to sever the continuous envelope or tubular structure into individual packages PP, and simultaneously, impart a crimp seal to each end of the package. The crimp seal is, in part, accomplished by bringing together into intermeshing abutting relationship a pair of elongate crimper bars, having a pattern of serrations or grooves transverse to the longitudinal axis of the bar, which grooves intermesh (see FIG. 7) to form the crimp seal.

Station 30 includes a pair of counter-rotating axles, identified by the reference numerals 41 and 42. Each axle has mounted thereon, in diametric positions, a pair of crimper bars. Axle 41 has mounted in diametric positions, crimper bars 43 and 44, while axle 42 has mounted, in diametric positions, crimper bars 46 and 47.

Figure 5:
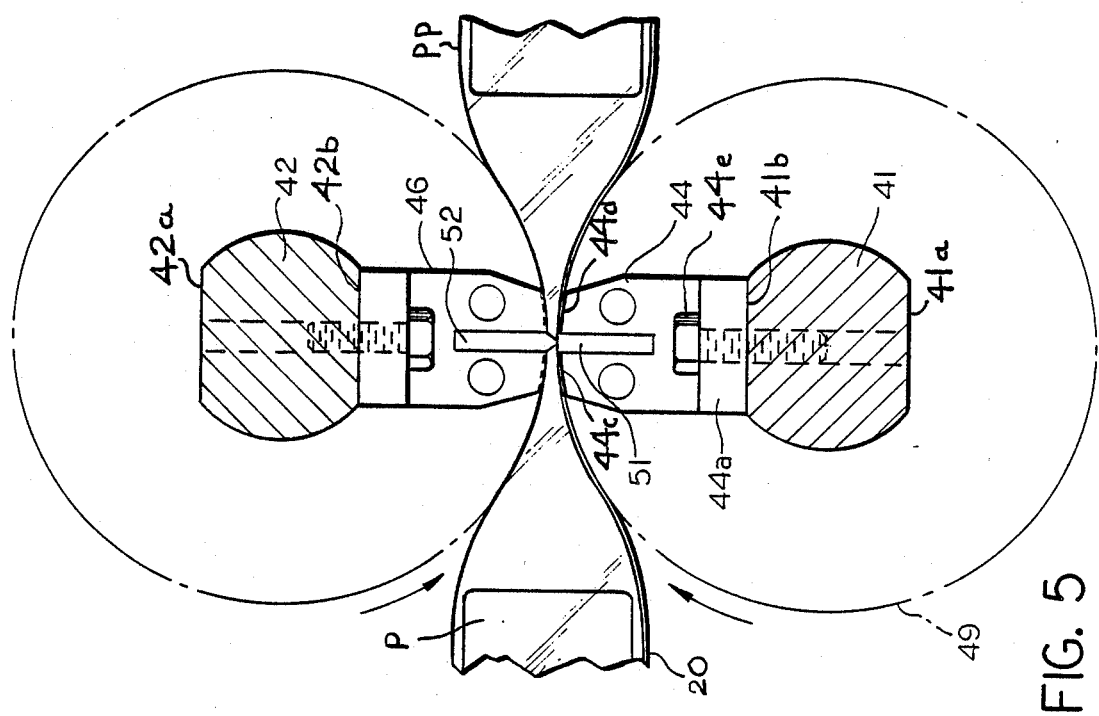
FIG. 5 is an end-view, partly in section, of the crimper bars used to impart the grooves while heat sealing the spaced edges of the package.

As can be seen, by reference to FIG. 5, the axle 41 is machined to define flat, mounting surfaces 41a and 41b, while axle 42 is machined to define flat surfaces 42a and 42b. These flat surfaces are adapted to receive the planar base of the crimper bars 43 and 44, and as well the crimper bars 46 and 47. However crimper bars 43 and 47 are omitted in FIG. 5 for purposes of simplicity of illustration. The crimper bars or dies include an integral flange at each end; such as the flange 44a (FIG. 8) having central aperture 44b therein receiving bolt 44e for securement of flange 44a and crimper die 43 to the axle 41 in the manner shown. Crimper bars 46 and 47 are secured to the axle 42 in the same manner.

The axle 41 rotates in a clockwise direction, as indicated by the arrow, while the axle 42 rotates in a counter clockwise direction via appropriate gearing as to bring the serrated surfaces 44c and 46c into intermeshing relationship (see FIG. 7) to distort and crimp the layer of thermoplastic sheet material. The illustration at FIG. 7 is of the central region, featuring the four thicknesses of sheet material, two of which thicknesses represent the fin seal 23, see FIGS. 3 and 4.

The serrations consisting of two parallel rows 44c and 44d (see FIG. 8) together define an arc or crown which corresponds to the circumference of the circle of rotation, identified by the reference numeral 49 in FIG. 5. The circle of rotation is that circle defined by the outer periphery of the crimper bar dies as they rotate with their respective axle 41 or 42. The serrations 44c and 44d (FIG. 8) extend the full length of the crimper bar/die, allbeit, only a small linear segment of the serrations are actually illustrated in FIG. 8, again in the interest of simplicity of illustration.

In addition to imparting the crimp seal to the trailing edge of one package and the leading edge, of another package; the crimper bar die severs one package from the other. For this purpose, crimper bar die 44 features an elongate anvil 51, located in an appropriately machined slot which extends the length of the bar and in the central region between the rows of serrations 44c and 44d. The anvil 51 is held by the recessed bolt 51a and other recessed machine bolts not shown. Matching crimper bar 46 (see FIG. 5) inludes an elongate cutter blade 52, which extends the length of the crimper bar die, as mounted in a similar central elongate slot between rows of serrations. The cutter blade 52 is positioned to impinge on the anvil 51, as at FIG. 5, sufficiently to sever the multiple thicknesses of thermoplastic sheet material as shown, with crimping serrations formed on either side of the crimper bars 44 and 46 pass in the path of the circle of rotation 49 in the direction indicated by the arrows 70 in FIG. 5.

Figure 6:
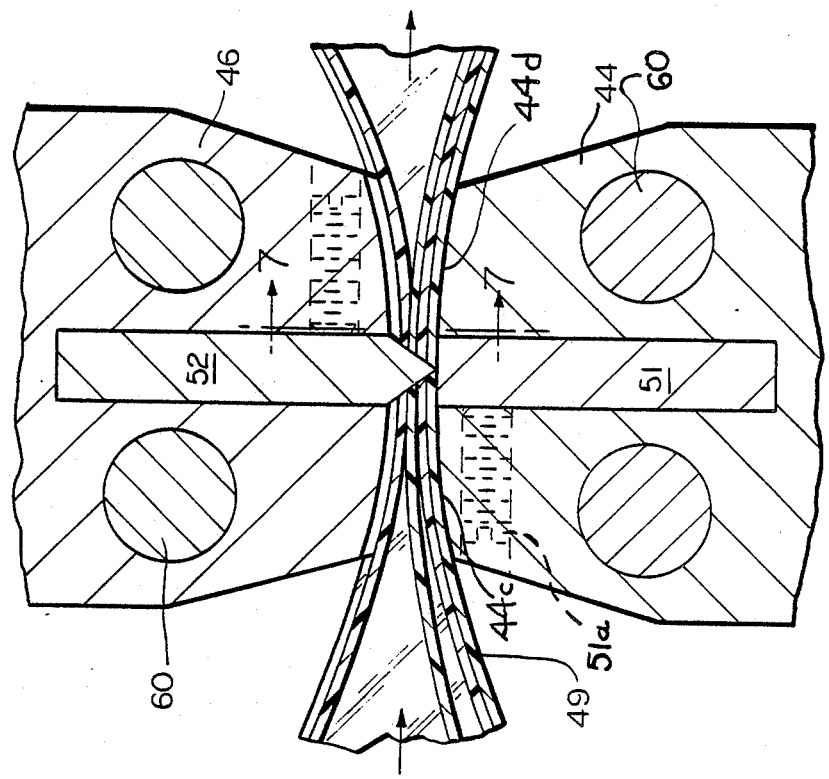
FIG. 6 is an enlarged view of a portion of FIG. 5, but taken on the line 6—6 in FIG. 4.

As can be seen by reference to FIG. 4 and FIG. 6, four thicknesses of thermoplastic sheet material are present in the central region of the intermeshing crimper bars, by reason of the double thickness fin seal 23 and the thickness of the material representing the top of the ultimate package and the thickness of sheet material representing the bottom of the ultimate package. The latter is compressed between the crimper bars, specifically the crimper bar 44 and 46, as viewed in FIG. 4. Thus simultaneously, the cutter 52 and opposed anvil 51 sever (see FIG. 6) while simultaneously the rows of serrations 44c and 44d on either side, (as viewed in FIG. 6) impart a crimp seal on what may be described as the trailing end of the package proceeding in the direction indicated by the arrow and the forward edge of the package to the left, as seen in FIG. 6.

Reference numeral 60 identifies internal heater rods located in each of the crimper bars to transmit heat through the metal and to the thermoplastic sheet material for the purposes of temporarily softening the sheet material as crimped or distored into the configuration shown greatly enlarged in FIG. 7, which crimp distortion remains on cooling, as the assembly cools to ambient temperature, and achieves through the cooling, a permanent set of the crimp seal in the thermoplastic sheet material.

Returning to FIG. 4, it is to be noted that it is the region of multiple thicknesses, due to the presence of the fin seal, and to a lesser extent a lap seal, which lies at the root of the difficulties enumerated earlier herein, including (1) the tendency for the advancing sheet material proceeding through the cutting and crimping station 30 to move laterally either to the right or left; and (2) the observation of crimp defects manifested by the presence of "cut-throughs" and thin spots which clearly lead to loss of the hermetic seal necessary to maintain the product within the package and isolated and sealed condition; all necessary to maintaining freshness, flavor and freedom from contamination, etc.

In accordance with further embodiments designed to additionally improve the present invention, it has been determined that the crimper bar surface contacting or impressed upon that side of the package containing the longitudinal seal should define a cotyledon or cotyloid, that is having a degree of bow or, in other words, having a degree of concavity which is of a particular magnitude and contour as to optimize the improvement in the quality and reliability of the hermetic seal as characterized by absence of broken seals, seal failure, seal leaks and imperfections, cut throughs, wrinkles, etc.. In this regard, it will be appreciated that there are several variables in the packaging operation as described herein. One variable is, of course, the size of the package which, of course, is determinative of the length of the closure seal. Generally, the length of the closure seal, as designated by the letters LOS in FIG. 9, may vary from approximately three inches to approximately nine inches. This value generally corresponds to the length of the crimper bar 44. Another variable is the thickness of the thermoplastic sheet material. This material can be cellophane, or polypropyelene, or similar sheet materials and generally employed in the packaging field. Cellophane was developed and formerly manufactured by the E.I. dupont, of Wilmington, Del. A grade of polypropyelene employed in the practice of the invention is manufactured by the Film Division of Mobil Chemical of Pittsford, N.Y., and marketed commerically by them under the grade designation "BSR". In the industry, as described, the film or sheet material generally will range considerably in film thickness. By reason of repeated experimental runs of the packaging operation, as described herein, it has been determined that the amount of bow or concavity expressed as the distance represented by the line labeled "d", in FIG. 9 should bear a definite relationship to the length of seal.

Specifically, the amount of bow, or concavity that is, the dimension designated by letter designation "d" in FIG. 9, should ideally measure 0.00050 inches per inch of the length of seal. This value is most valid with respect to polypropylene sheet material having a gauge or thickness of 1.2 mil. The following Table I, lists in three columns, values for length of seal, or film thickness in mils., and the amount of bow in inches as determined from a series of runs employing sheet material of variant film thickness plus variant length of seal definitive of the particular package being formed, filled with product and severed in the manner described hereinbefore.

TABLE I

| L.O.S. Length of Seal | Film Thickness | Amount of Bow |
| --- | --- | --- |
| 4.625 inches | 1.20 mils | 0.0023 inches |
| 7.00 inches | 1.32 mils | 0.0035 inches |
| 7.00 inches | 0.90 mils | 0.0035 inches |

TABLE I-continued

| L.O.S. Length of Seal | Film Thickness | Amount of Bow |
| --- | --- | --- |
| 9.00 inches | 1.20 mils | 0.0045 inches |
| 3.50 inches | 1.32 mils | 0.00175 inches |
| 6.625 inches | 1.40 mils | 0.0033 inches |

Based on the; foregoing determinations, it has been found that the data in following Table II will serve as a general correlation of the length of seal and the amount of bow or concavity measured in the center, that is the letter "d" in FIG. 9.

TABLE II

| Length of Seal (inches) | Bow (Fraction on an inch) |
| --- | --- |
| 3.5 | 0.00175 |
| 4.0 | 0.002 |
| 4.5 | 0.00225 |
| 4.625 | 0.0023 |
| 5.0 | 0.0025 |
| 5.5 | 0.00275 |
| 6.0 | 0.0030 |
| 6.5 | 0.00325 |
| 7.0 | 0.0035 |
| 7.75 | 0.00387 |
| 9.0 | 0.0045 |

Repeated runs in accordance with the preceding description in which the length of seal and the bow were varied yields the preferred value for the amount of bow or concavity which allows the crimper bars sets to be formed or machined with predictable arruracy that such will provide improved hermetic seal as demonstrated by lack of rejects, lack of breaks, lack of cut through, etc.

By way of further explanation, it should be recognized that in the practice of the present invention, the arc or curvature of the bow or concavity defines, in each case, the circumference of a circle having a chord corresponding to the length of the seam, and further characterized by a dimension "d" measured from the midpoint of the chord to the circumference or arc of said circle. It will be appreciated that from these values, and the application of the principles of geometry, the radius of diameter of the appropriate circle and correspondingly, the appropriate curve of the bow concavity can be calculated so that the surface of the crimper bar can be appropriately machined or ground with the creation of the serrations, and thereby, achieve a crimper bar, die or jaw, having the appropriate characteristics in accordance with the precepts of the present invention.

Generally, it has been determined that the amount of bow shall measure 0.00050 inches per inch of seal with the further understanding that smaller gauge film will require less bow and larger gauge film will require a somewhat larger degree of bow or concavity, eg. the dimension of the letter "d" in FIG. 9.

The preceeding data is generally applicable to the seal package as illustrated in the drawings and specifically in FIG. 4.

For a lap seal, in which the number of thickness is three; the amount of bow necessary to achieve comparable results is adjusted to about 50% of the value listed in the aforesaid tables.

In the interest of conciseness and avoidance of surplusage; the invention has been described with referene to a so-called horizontial machine in which the sheet material travels, for the most part, in a horizontal plane as the lateral edges are folded, the product is introduced into the package formed and the package ends crimped sealed and severed to form individual packages.

However it is to be recognized that the concept of the present invention is equally applicable to a vertical machine. In a vertical machine, the sheet of thermo plastic material travels for the most part in a vertically downward path during which the lateral edges are folded over into overlapping relationship to form either a lap or fin seal, the product is introduced into the thus formed tubular structure and thereafter the individual packages are formed by passing the assembly downwardly between a pair of crimper jaws in parallel, spaced relationships on either side of the downward path. The jaws move reciprocatingly into and out of intermeshing interengaging relationship as to impart the serrations forming the crimp seal and to sever the region between crimping zones to form individual packages. Unfortunately the employment of the conventional crimper jaws is found to yield a undersirable percentage (30-40%) of packages rejects. These are essentially eliminated by the practice of the present invention which has been described in considerable detail herein and above and need not be repeated beyond saying that the employment of the bow or concavity in the crimper jaw contacting the side of the package containing the longitude seal is just as effective and yields a reject rate of about 5%.

It should be fully understood that the practice of the present invention does not require thermo plastic sheet material. Foil and other types of sheet material may be employed in conjunction with either a thermo plastic adhesive or a cold setting adhesive of the type generally used in the industry frequently for packages containing choclate candy, which would melt if heated crimper dies were used.

It is within the frame work of the present invention to employ a bow which is off center one way or another rather than completely centered as described generally hereinabove. In other words, by reference to FIG. 9 it will be appreciated that the dimension "d" occurs in essentially the exact center of the crimper bar as shown. In accordance with the presently described embodiement, the bow or amount of bow, may be greatest at a point either to the left or to the right as seen viewing FIG. 9. This shifting of the center of the bow is desireable in connection with packages favored by manufactures who design their packages in such fashion that the longitudinal fin or lap seal is located other than in the center; that is to one side or the other. In either case, it is desired that the bow contour extend from one end of the length of the seal to the other in gradual form.

Not only may the crimping surface be modified in accordance with the present invention by provision for a bow or concavity in the center or on either side of the center as just previously described; but it is also within the purview of the present invention for a given crimper bar/jaw/die to be formed or machined so as to embody several regions of bow like curvatures or concavity for purposes of accomodating more than one region of variant thickness of sheet material. . One example of varient thickness sheet material is represented packages with gussetts which are reverse fold pleats frequently employed in the art to provide a package of somewhat larger volume. At the same time it should be appreciated that the present invention is clearly not limited to comestible products but any product adaptable to packaging as described herein.

While the packaging operation was described earlier herein, as featuring a depending fin; it is to be understood that some manufactures production and packaging aligns feature a fin seal which projects upwardly on the top side of the package.

From the foregoing it should be clear that by reason of the multiple grooves or serrations, the crimping surface may be chacterized as a serriform surface, while at same time it may be chacterized as cotyledonal or defining a cotyloid or cotyledon. Furthermore the crimping surface may be chacterized as a compound cotyloid and serriform.

Modifications and substitutions may be logically and obviously suggested and easily resorted to; all without departing from the spirit and/or scope of the present invention. However all such modifications, equivalents, substitutions, and/or minor departures from the explicit description/language employed here-in-above, are intended to be considered as included within the present invention, unless to do so would do violence to the language of the appended claims.

I claim:

1. An improved crimper die for imparting crimp seals to ends of packages wrapped in sheet material, said die comprising a serriform crimping surface which defines a cotyloid.

2. A die as claimed in claim 1 in which the curve defining said cotyloid is the arc of a circle having a chord length characterized by a midpoint to circle circumference distance about 0.00050 inches per inch of chord length.

3. A die as claimed in claim 1 wherein the cotyloid is compound.

4. An improved crimper die as claimed in claim 1 in which the curve defining said cotyloid is the arc of a circle, said circle having a chord length correponding to the operative length of the crimping surface.

5. A combination crimper die set, for hermetically crimp sealing, in serial fashion, ends of packages of product, inclusive of thermoplastic sheet wrapping material arranged into generally oval shape comprising, a pair of elongate bar dies having facing, complementarily serriform surfaces, said elongate bar dies being constructed and arranged for reciprocal movement to bring said serriform surfaces into and out of interengaging relationship to form said crimp seal at spaced regions between individual items/portions/amounts of product contained in said package wrap, one of elongate bar dies including an integral concavity coextensive and integral with said serriform surface.

6. The invention as claimed in claim 5, wherein said concavity extends the entire length of said serriform surface.

7. In a combination of components for continuously converting a continuous length of sheet material into a plurality of packages containing appropriate product in measured amount, weight or number corresponding to a desired package, including;
  (1) means for supplying a continuous length of sheet material having lateral edges;
  (2) means for directing said sheet material in a linear path, while folding said lateral edges about and inwardly, to form a generally tubular structure;
  (3) means for conjoining said lateral edges into a continuous longitudinal seal, while simultaneously introducing product into said tubular structure;
  (4) a pair of relatively moveable, elongate crimper bars having severing means extending the length thereof, each of said pair having a linear serriform surface of interengaging serrations adapted to impart a crimp seal;

(5) means for causing said pair of crimper bars or jaws, including severing means, to sequentially come together with linear serriform surfaces in facing, crimp seal and severing relationship, in incremental fashion in between said measured amount, weight, or number of product as define a finished package; and (6) means for directing said product-containing tubular structure in a path between said pair of elongate crimper bar in timed relationship therewith, the improvement wherein the crimping serriform surface of one of said crimper bar/jaws is slightly concave with respect to its matching crimper bar/jaw, whereby a reliable hermetic seal is consistently achieved.

8. The combination as claimed in claim 7, wherein said sheet material is formed of a thermoplastic material.

9. The combination as claimed in claim 8 wherein said slightly concave surfaced, crimper bar is positioned on the side of said tubular structure containing the longitudinal seal.

10. The combination as claimed in claim 9 wherein said concavity is present the full length of said seal.

11. The combination as claimed in claim 10, wherein said concavity defines an arc of a circle characterized by a chord length corresponding to the operative length of the crimper bar/jaw, said chord having a midpoint tocircumference distance of about 0.00050 inches per inch length of crimper seal.

* * * * *